United States Patent [19]
Kehren

[11] 3,946,988
[45] Mar. 30, 1976

[54] TREE AND THE LIKE OBSTACLE EXTRACTOR

[76] Inventor: Jakob Kehren, Ziegeleiweg 8, 4990 Lubbeck i. Westf., Germany

[22] Filed: June 5, 1974

[21] Appl. No.: 476,533

[30] Foreign Application Priority Data
June 8, 1973 Austria ............................... 5109/73

[52] U.S. Cl.............. 254/30; 254/93 R; 254/133 R
[51] Int. Cl.² ......................................... E21B 19/00
[58] Field of Search .............. 254/132, 30, 133, 134

[56] References Cited
UNITED STATES PATENTS

| | | | |
|---|---|---|---|
| 2,681,789 | 6/1954 | Nichols | 254/132 |
| 3,155,372 | 11/1964 | Brown | 254/30 |
| 3,548,899 | 12/1970 | Emerson | 254/133 R |
| 3,734,463 | 5/1973 | Enright | 254/30 |
| 3,773,292 | 11/1973 | Thiermann | 254/30 |

*Primary Examiner*—Al Lawrence Smith
*Assistant Examiner*—Robert C. Watson
*Attorney, Agent, or Firm*—Steinberg & Blake

[57] ABSTRACT

A device for extracting trees, stumps and the like obstacles from the ground of the type having a pressure medium cylinder supported on a stand and with a holding member carried by its piston rod is provided which permits manual operation, the piston rod being spaced from the holding member and connected to a guide member for contacting the obstacle, and a holding member with a holding link for gripping the partly pulled out obstacle being rigidly mounted on the pressure cylinder.

5 Claims, 5 Drawing Figures

U.S. Patent  March 30, 1976  3,946,988
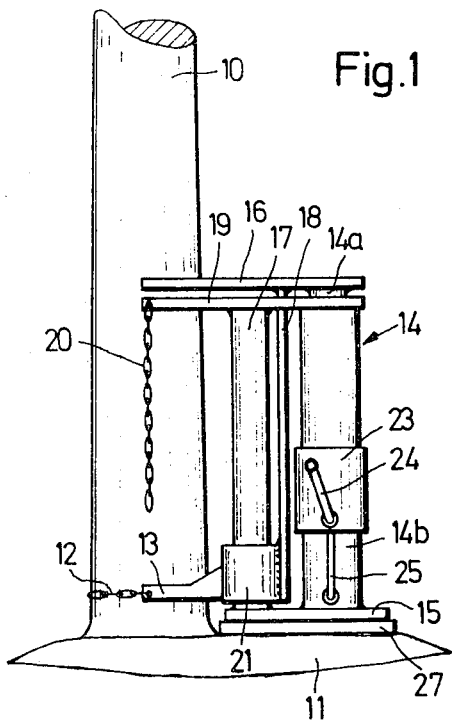
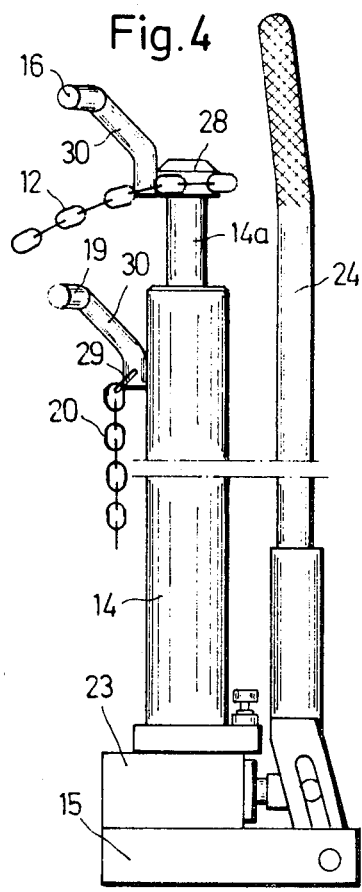
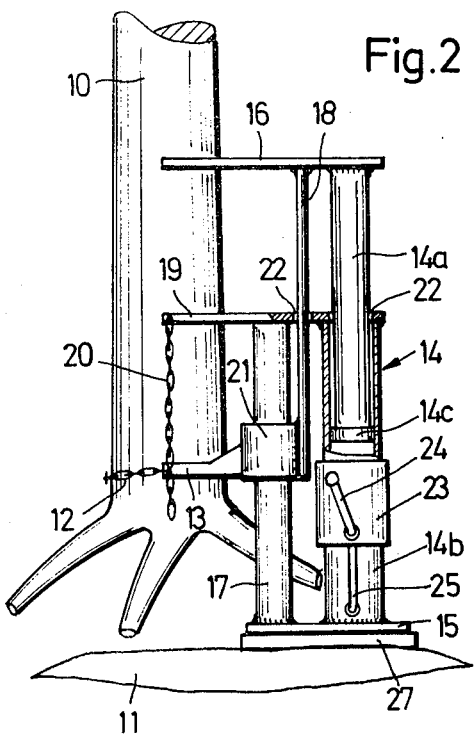
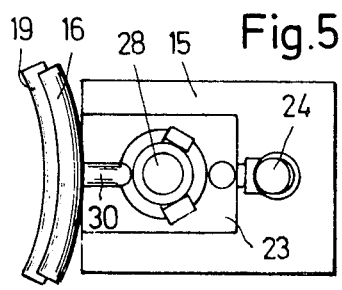
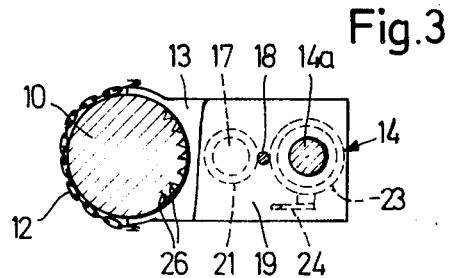

TREE AND THE LIKE OBSTACLE EXTRACTOR

This invention relates to a device for pulling trees, bushes, masts poles or the like obstacles out of the ground or the like base having a pressure medium cylinder disposed on an upstanding part and forming a lifting means the piston rod of which pressure medium cylinder is connected as a lifting member to a chain, cable, clamp, tongs or the like holding member embracing the obstacle at least partially.

A tree stump uprooter has been proposed which has on a portable stand a pressure medium cylinder which, by means of traction rods connected at a variable effective height on the pressure medium cylinder, engages on a tree stump to be rooted out and draws this tree stump up from the ground.

This known tree stump uprooter has a comparatively large and heavy construction and its constructions is of expensive design. Furthermore a tree stump uprooter is known which is formed from an articulated parallelogram, a screw threaded spindle varying the configuration of the parallelogram and engaging the tree stump by a chain or like cable.

Extraction of the tree stump is achieved with this known uprooter by manual rotation of the screw threaded spindle which requires great expenditure of force.

The known tree stump uprooters serve only for the uprooting of tree stumps and cannot be employed for the pulling out of trees, masts, poles or the like as they engage on same above the tree stump and are designed only for removal from the ground of a part which is small in height.

The object of the invention is to improve a device of the type referred to for pulling out trees, bushes, masts, poles or the like obstructions from the ground or the like crust and to minimise complication and expense in its construction, to permit a design small in volume, light in weight and with which with small expenditure of force a considerable extracting force for the part to be pulled out is achieved and at the same time a secure grip is achieved during the pulling out of the part to be pulled out. The device is furthermore constructed stable and durable as well as transported in a space saving manner and operated by one person.

According to the invention a device of the type referred to for pulling trees, bushes, masts poles or the like obstructions from the ground is provided with a piston rod, of the pressure medium cylinder, spaced in the direction of its movement apart from the holding member for pulling out the obstruction and connected to a guide member embracing at least partially the tree, bush, mast, pole or the like obstruction, the pressure medium cylinder having a rigidly mounted holding member firmly gripping in the partly pulled out position the partly pulled out tree, bush, pole, mast or the like obstruction by means of a holding link.

In a preferred embodiment of the device feet or the like support with a stand formed by a plate, on both sides of the tree, a perpendicular guide formed by a spar, a rod, a tube or the like is mounted with a traction member held adjustable in height therearound and is parallel to the traction member guide of the pressure medium cylinder with its height adjustable piston rod on the stand whereby on the upper end of the piston rod the guide member is fixed and the upper end of the traction member guide and the pressure medium cylinder the holding member is disposed between the guide member and the traction member; the traction member may be coupled movably rigid to the piston rod via a traction part such as a rod, bar, tube or the like fixed to a lower end on the traction member and the other upper end on the guide member.

By means of the holding member pulling out the tree or the like, by means of the guide member arranged spaced apart therefrom and by means of the holding member of the device according to the invention arranged spaced apart therefrom the tree, mast, pole, bush is guided in the pulling out direction during extraction on three places spaced apart above one another and thereby secured against tipping over or tilting so that the carrying out of the pulling out is in no way adversely affected. Furthermore due to this extraction guide comparatively small lifting forces are necessary which only has to effect the pulling out and a force against tipping over or tilting of the tree or the like do not have to be applied.

The three members disposed over one another for the pulling out, guiding and holding of the tree or the like are simply constructed, embrace in an advantageous manner the tree or the like albeit partially and thereby secure fixing and give the device an optimum work output. The device is extemely small in volume and light in weight, composed of few parts and can be operated very simply and in a power saving manner by one person and transported in a space saving manner; furthermore the device exhibits a stable and durable construction and is produced economically.

Due to the favourable construction of the traction, guide and holding members the tree, bush, mast, pole or the like may be securely seized at any height position and in a large area trees, bushes, masts, poles or the like with different cross sections can be pulled. The whole device is built simply and economically, has a long life and a multiple use with extremely rational working design. The scope of protection of the subject matter of the invention extends not only to the features of the individual claims but also to their combination.

Embodiments of the invention are shown in the drawing.

FIG. 1 shows in the traction starting position a front view of a device for pulling trees, bushes, masts, poles or the like from the ground, FIG. 2 shows a front view of the same device with tree pulled out, FIG. 3 shows a plan in cross section of the same device with tree, FIG. 4 shows a side view of a device on a further design, FIG. 5 a plan of the device according to FIG. 4.

A device according to the invention in particular a manual device for pulling out trees 10, shrubs, masts, poles or the like from the ground 11 or other base or holding surface for the pulling parts has a traction shoe 13 with a holding member 12 embracing at least partly the tree 10, shrub, mast, pole or the like to be pulled out which traction member is movable upwards in the pulling out direction, (i.e. that of the trees height,) by a lifting device 14.

On a set up stand 15 such as a base plate, feet or the like supported directly or indirectly on the ground 11, the lifting device 14 is mounted with a lifting member 14a movable in height and preferably of adjustable height in which a guide member 16 for embracing at least partially the tree 10 is rigidly secured; with the upward movement of the lifting member 14a the guide member slides along the tree 10.

Furthermore stand 15 carries an upright guide 17 such as a guide spar — it may be a tube or rod of circular or square cross section — around which the traction member 13 is held at an adjustable height.

The traction member 13 is, via a traction part 18, such as a rod, a tube, a bar, a profiled part or the like, rigidly connected to the guide member 16 movable in height by means of the lifting members 14a so that with the vertical movement of the guide member 16 by means of the traction part 18 the traction member 13 is likewise moved vertical.

On the traction member guide 17 and the lifting device 14 there is disposed a holding shoe 19 fixed in height embracing at least partially the tree 10, which holding member is connectible to a holding member 20 firmly holding the tree in the partly pulled out vertical position. The traction member guide 17 is disposed in the edge area of the plate-like stand 15 adjacent to the tree 10, shrub, mast, pole or the like to be pulled out and firmly connected to the set up part 15 by welding, screws, rivets or the like. The traction member 13 is mounted with a guide sleeve 21 about this guide 17 and the sleeve 21 has scraper lips (not shown) at the end sliding along the guide 17 and freeing the guide 17 from any dirt.

On the side area of the guide sleeve 21 turned away from the traction member 13 the upright traction rod 18 is fixed by welding, screw or rivets at its free lower end.

Spaced apart from the traction member guide 17 the lifting device 14 is supported on the stand 15, which lifting device is likewise connected firmly and if necessary, detachably, to the set up part 15. The traction rod 18 thus extends between the guide 17 and the lifting device 14 and is with its other, upper, end in rigid connection with the guide member 16, which connection is achieved by welding, screws or rivets.

Holding member 19 is mounted on the upper end of the guide 17 and the lifting device 14 by means of screws, welding, rivets, or the like connected and provided with openings 22 for the vertically movable lifting member 14a and the vertically adjustable traction rod 18.

The three members 13, 19, 16 disposed over one another run preferably parallel to one another and lie each in a horizontal plane. The guide 17, the traction rod 18 and the lifting device 14 extend likewise parallel to one another and all run in a vertical direction. The three members 13, 19, 16 are designed preferably clawlike and fork like and have in plan a partly circular, V-shaped or trapezoidal basic shape with which the contact at least on individual places on the tree trunk 10, shrub, mast, pole.

As a lifting device 14 there is provided in a preferred manner a pressure medium cylinder preferably a hydraulic cylinder which is framed with its cylindrical housing 14b on the part 15 and the piston rod of which forms the lifting member 14a. On the upper end of the stationary cylinder housing 14b there is mounted the holding member 19. The hydraulic pressure medium cylinder 14 is in communication with a pressure medium container 23 and a hand pump or rotary alternating current motor or pivot shaft or vehicle hydraulics disposed therein. The cylinder housing 14b is surrounded by the pressure medium container 23 over part of the height of the former. A manually operable lever 24 of the pump arranged on the outside of the pressure medium container 23 effects with its to and fro pump movement a pressure medium flow from the container 23 via a pipe 25 into the cylinder housing 14b for the lifting of the piston 14c. The holding member 12 of the traction member 13 and the holding link 20 of the holding member 19 are formed preferably by a chain which is looped once or several times, preferably several times, and crossed over around the tree 10 to be pulled. One end of each chain 12, 20 is, for example, fixed on the respective member 13, 19 and the other end of the chain is detachably hooked in an eyelet, a hook, a bifurcated bolt or firm locking recesses.

Instead of chains as holding members 12, 20, cables, belts, straps, clamps or the like are provided. The traction member 13 is provided on its face contacting on the tree 10 with a contact face which may be formed by roughening cammed projections 26 or the like grips.

For the uprooting of the tree 10, bush, mast, pole or the like the device is set up near the tree 10 on the ground 11 or on a plank 27 or the like placed on the ground 11 whereby the members 13, 19, 16 partly surround the tree 10. The traction 13 is moved by a very light hand pressure from about into the lowermost position near the set up part 15 (FIG. 1). The holding member 12 is now looped around the tree 10 and anchored to the member 13, the other holding member 20 hangs only on one side engaged with the holding member 19 or removed from the member 10 so that it does not embrace the tree 10.

By means of a pumping movement on the hand lever 24 with manual operation the piston 14c is lifted with a pressure medium, oil or other liquid, and the lifting member 14a is moved upwards. With this displacement of the lifting member 14a the guide member 16 imparts to the tree 10 upon pulling out a guiding movement moves upwards and via the traction rod 18 likewise drawn upwards. With this upward movement of the traction member 13 and the holding member 12 clamped around the tree 10, the tree 10 is pulled out the ground 11. When the traction member 13 has reached the uppermost position of displacement near the holding member 19 the tree 10 or the like may be pulled out of the ground 11. If however the tree 10 or the like in this uppermost traction member position is only partly pulled out of the ground 11 a renewed traction procedure must be initiated. For this if necessary the holding member 20 must be looped around the tree 10 or the like rod and clamped on the holding member 19. The traction member 13 is now allowed a little downwards so that the holding chain 12 is loosened and the holding member — holding chain 20 — is clamped around the tree and firmly holds this against movement downwards. The holding member 12 can now be released from the traction member 13 and by light pressure by hand on the guide member 16, the lifting member 14a with the traction member 13 is again moved downwards into the starting position where the holding chain 12 is again looped around the tree 10 and is fixed on the traction member 13. After a short travelling up of the traction member 13 the holding chain 20 is looser and can be removed. The holding chain 20 is now released from the holding member 19 and by an upward movement of the lifting member 14a a new drawing stroke takes place.

These drawing procedures are repeated until the tree 10, shrub, mast pole or the like obstruction has been completely pulled out of the ground 11.

With one embodiment (not shown) the pressure medium cylinder 14 can also be operated by motor for the upward movement of the lifting member. Furthermore with a further embodiment, not shown a motor displaceable toothed rod can be provided as a lifting device 14.

In addition there is the possibility of employing a telescopic cylinder as a lifting device 14 which renders possible a greater lifting height.

The fork-like members 13 and 19 may also be formed by tongs changeable mechanically or by a pressure medium so that the chains 12, 10 are replaced by these tongs and the member forms at the same time a holding member. There is also the possibility of arranging the member 13 directly on the lifting device 14.

Furthermore the lifting device 14 can be formed by a screw thread spindle movable by motor or manually.

The whole device forms a compact easily transportable constructional unit.

The device for pulling out trees, shrubs, masts, poles or the like from the ground or the like shown in a further construction in FIGS. 4 and 5 corresponds in its basic construction and in its manner of operation to the device according to FIGS. 1 to 3 and contains partially parts of this first device. With this further construction of the device the pressure medium cylinder 14 is mounted on the hand lever pump 23, 24 which is supported on the set up part 15. The pressure medium cylinder 14 extends vertically and the hand pump 24 operating the pump 23 is pivotable, to and fro for example, on the stand 15. On the upper part of the piston rod 14a of the pressure medium cylinder 14 the holding member 19 is arranged whereby both members 16, 19 are formed from bent tubes and rods and by means of a distance piece 30 fixed on the associated pressure medium cylinder part 14a, 14 directed upwards and obliquely away from the pressure medium cylinder 14 and held spaced apart therefrom rigidly on the piston rod 14a and the pressure medium cylinder 14. A holding piece 28, 29 is provided on the free end of the piston rod 14a held in the region of a distance piece 30 by the pressure medium cylinder 14, for detachably, or at least at one end detachably, engaging a holding member 12, 20 formed by a chain or the like cable. The two part holding piece 28, 29 can be formed by cooperative eyelets, hooks firm locking recesses for receiving and applying the chains.

For pulling out a tree 10 or the like the device is placed at the tree 10 with its two arcuate members 16, 19 partly embracing the tree 10. The piston rod 14a is driven into the cylinder 14. The holding member 12 is looped around the tree and connected to the holding piece 28 of the piston rod 14a. By pivoting the hand lever 24 a pressure medium is introduced into the cylinder 14 which pushes the piston rod 14a upwards. The piston rod 14a takes upwardly with it, via the guide members 16 and the chain 12, the tree 10 or the like and uproots it from the ground 11. Thereby the member 19 contacts the tree and in conjunction with the member 16 guides it so that it cannot tip over but is drawn in a position at least almost vertical. If the piston rod 14a is driven out the chain 20 is looped around the tree and fixed on the holding piece 29 such that this chain 20 now holds the tree in the pulled out position. The piston rod 14a is slightly lowered, the chain 12 is then released and the piston rod 14a can now be completely driven in. The chain 12 can then again be connected on the holding piece 28 and after release of the chain 20 a new lifting is effected by the piston rod 14a for pulling out the tree.

The device shown in FIGS. 4 and 5 is constructed extremely small in volume, light in weight and has few individual parts which with small expenditure of force renders readily possible a securely guided extraction of a tree or the like obstruction.

Thus, it will be seen that with the embodiment of FIGS. 1–3, the member 16 together with the rod 18 and element 13 with chain 12 form a movable releasable holding means for releasably holding the article 10 which is to be pulled, this movable releasable holding means being connected with the movable part 14a of the lifting means 14, while in the embodiment of FIGS. 4 and 5 the element 16 together with the chain 12 form the corresponding movable releasable holding means connected to the movable part 14a of the lifting means 14. On the other hand, in both embodiments the part 19 together with the chain 20 form a stationary releasable holding means connected to the stationary part 14b of the lifting means 14. It is clear that when the movable part of the lifting means moves upwardly the movable releasable holding means is in its holding position while the stationary releasable holding means is in its released position. When a further stroke is to be carried out, however, the stationary releasable holding means is placed in its holding position while the movable releasable holding means is placed in its release position permitting the movable parts of the lifting means to be returned to its starting position prior to commencing the next stroke when the stationary releasable holding means is again placed in its release position while the movable releasable holding means is again placed in its holding position.

What is claimed is:

1. A device for pulling trees, bushes, masts, poles or like obstacles out of the ground or a similar base, comprising lifting means having a lower stationary part and an upper movable part adapted to move upwardly with respect to said stationary part when carrying out a lifting stroke, said lifting means being adapted to be situated on the ground or similar base adjacent the obstacle, movable, releasable holding means operatively connected with said movable part of said lifting means for movement therewith and for holding the obstacle when said movable releasable holding means is in a holding position while releasing the obstacle when said movable releasable holding means is in a release position, and stationary releasable holding means operatively connected with said stationary part of said lifting means to remain stationary therewith and also having a holding position for holding the obstacle and a release position for releasing the obstacle, said lifting means including a cylinder forming said lower stationary part and a piston forming said upper movable part and having an upper free end, said movable releasable holding means including an upper guide member fixed to said upper free end of said piston and having a portion adapted to extend partially around the obstacle, said movable releasable holding means including a lower guide member situated beneath said upper guide member and also having a portion adapted to extend partially around the obstacle, and one of said guide members having an elongated flexible element adapted to extend around the remainder of the obstacle and be fixed with said one guide member when said movable releasable holding means is in its holding position while said flexible element can hang freely from said one guide member when said movable releasable holding means is in its release position, said stationary releasable holding means including a third guide member situated between said upper and lower guide members and fixed to said cylinder and having a portion also adapted to extend partially around said obstacle while carrying a flexible element adapted to extend around the remainder of the obstacle and be fixed with said guide member when said stationary releasable holding means is in its holding position while the latter flexible element can hang freely from said third guide member when said stationary releasable holding means is in its release position, said third guide member being formed with an opening and said movable releasable holding means including an elongated traction rod extending between and fixed to said upper and lower guide members and extending through said opening.

2. The combination of claim 1 and wherein an upright guide extends parallel to said lower cylinder of said lifting means and carries a guide sleeve to which said lower guide member is fixed and to which said traction rod is fixed with the latter being situated between said upright guide and said lifting means.

3. The combination of claim 2 and wherein said lower guide member carries said flexible element of said movable releasable holding means.

4. The combination of claim 3 and wherein said upright guide and said cylinder and piston extend vertically during use thereof while all of said guide members extend substantially horizontally.

5. The combination of claim 1 and wherein each of said releasable holding means carries a member for fixedly holding said flexible element when each releasable holding means is in its holding position.

* * * * *